United States Patent Office 3,646,174
Patented Feb. 29, 1972

3,646,174
PROCESS FOR MAKING SPHEROIDAL
AGGLOMERATES
Bruno J. Macri, Springfield, Va., assignor to The
Susquehanna Corporation, Fairfax County, Va.
No Drawing. Filed Dec. 12, 1969, Ser. No. 884,697
Int. Cl. C06b 21/02
U.S. Cl. 264—3 C
14 Claims

ABSTRACT OF THE DISCLOSURE

Process for making spheroidal agglomerates of particulate solids, such as metallic materials, bonded by a matrix of an organic polymer, which comprises mixing the solid particles with an organic liquid prepolymer curable to a solid polymer, and a volatile liquid which is immiscible with the prepolymer and does not dissolve the solid particles; and continuously agitating the resulting mixture while removing the volatile liquid. During such simultaneous agitation and removal, the prepolymer and solids coalesce into globules containing the particles dispersed therein. The agitation and removal continues until the prepolymer cures into a solid polymer. By liquid "prepolymer" is meant a liquid polymer which is further curable into a higher molecular weight or crosslinked solid polymer. Cure of the prepolymer can be accomplished thermally and/or by addition of curing agent. It is generally preferred to include curing agent in the process mixture.

The solid particles may be the same or different substances. If different, they are intimately admixed in each agglomerate spheroidal particle in desired ratios of concentration.

BACKGROUND OF THE INVENTION

Spheroidal agglomerates or "beads" of finely-divided particulate solids bonded together in a matrix of an organic polymer have a number of useful applications. Such agglomerates comprising particulate high-energy fuel such as metallic fuel or carbon, solid oxidizer, or mixtures thereof, have particular application in the propellant, explosive, igniter, and pyrotechnic arts. In propellants, for example, such beads can be dispersed in the propellant grain matrix to provide all or some of the required metallic fuel and oxidizer. They improve propellant processing and make possible increased solids loading, particularly where the desired particle sizes of the fuel or oxidizer are exceedingly small. In the case of fuel-rich propellants for air-augmented rocket propulsion, they are particularly useful for improving ballistic properties desirable for that particular type of propulsion system. The organic polymer matrix of the beads readily disintegrates during combustion of the propellant to release the metallic fuel and/or oxidizer to provide their required functions in the propellant.

Prior processes for making such spheroidal agglomerates have a number of disadvantages, such as poor controllability of particle concentration and agglomerate size or excessive production time and cost. U.S. 2,988,438 discloses, for example, a process involving a solid organic polymer, a volatile solvent which dissolves the solid polymer to form a lacquer, an immiscible liquid, such as water, as a vehicle for the formed globules of lacquer, and a protective colloid to prevent coalescence of the suspended lacquer particles. Such a process requires removal of both the lacquer solvent and the water as well as washing to remove the protective colloid. The process additionally cannot be used to agglomerate water-soluble solids, such as oxidizer salts, unless both the lacquer solvent and the non-solvent immiscible liquid vehicle are relatively expensive volatile organic liquids and the protective colloid is washed off with a non-aqueous vehicle.

The process of this invention produces spheroidal agglomerates of controllable solids concentration and bead sizes with the use of a single immiscible volatile liquid in a short processing time and without the requirement for other processing additives, such as protective colloids.

An object of the invention is to provide a new and improved process for making spheroidal agglomerates of particulate solids wherein the solids are bonded within a matrix of a solid organic polymer.

Another object is to provide a process for producing such spheroidal agglomerates which permits a high degree of size and quality controllability.

Still another object is to provide a process which is highly economical both in time and cost.

Another object is to provide a process for making spheroidal agglomerates comprising agglomerated high-energy fuel particles, such as metallic fuels, and/or solid oxidizers for use in propellants, explosives, igniters, and pyrotechnic compositions.

Other objects will become obvious from the detailed disclosure herein.

SUMMARY OF THE INVENTION

The invention relates to a process for bonding finely-divided solid particles by means of a solid organic polymer matrix into the form of spheroidal aggregates or beads, which comprises: admixing the solid particles with an organic liquid prepolymer curable to a solid polymer and a volatile liquid which is substantially immiscible with the prepolymer and does not substantially dissolve the solid particles; agitating the resulting mixture and simultaneously removing the volatile liquid, thereby forming spheroidal globules of the liquid prepolymer containing the solid particles dispersed therein; and continuing the agitation and removal of the volatile liquid until the prepolymer cures into a solid polymer. Any remaining volatile liquid is then removed and the resulting solid spheroidal agglomerates, which comprise the solid particles dispersed in a matrix of the solidified organic polymer, are post cured if required.

By liquid prepolymer is meant a liquid polymer which is further curable into a higher molecular weight or cross-linked solid polymer. The term also includes prepolymer formed in situ by polymerization of monomer or co-monomers initially introduced into the process mixture in lieu of prepolymer.

Cure of the prepolymer can be accomplished thermally and/or by addition of curing agent. It is generally preferred to include a curing agent in the process mixture. The term curing agent as used herein connotes any type of compound that promotes further polymerization of the prepolymer, including, for example, initiators, accelerators, catalysts, crosslinking agents, and the like.

The particulate solids, prepolymer, curing agent, and immiscible volatile liquid can be mixed in any desired sequence. The volatile liquid can be removed by volatilization caused by frictional heat developed during mixing, and preferably by application of vacuum and/or external heating to increase rate of volatilization. Any post cure of the polymer bead matrix may be accomplished in conventional manner, such as heating in an oven.

The process is simple to operate; can be carried out in conventional mixers, preferably provided with vacuum and external heating means; requires only a single volatile liquid that can be readily recovered; and can be completed to the point of post cure, if required, in a relatively short time.

The process can be applied to any particulate solids for any application wherein spheroidal agglomerates are desirable. It is particularly useful for the production of spheroidal aggregates of particulate high-energy fuel additives, such as metallic fuels and carbon, particulate solid oxidizers and mixtures thereof for use in propellants, explosives, igniters, and pyrotechnic compositions.

PREFERRED EMBODIMENTS

The mixing of the process components can be done in any desired sequence. For example, the liquid prepolymer can first be mixed with the particulate solids and then with the volatile liquid; or the particulate solids can first be mixed with the volatile liquid and then with prepolymer. Curing agent can be added in admixture with the prepolymer or in any other desired mixing sequence.

The mixture of components is at first a slurry which apparently comprises the particulate solids coated with the prepolymer suspended in the volatile liquid vehicle. The prepolymer-coated solid particles progressively coalesce into larger globular agglomerates of spheroidal shape as the mixture is agitated with simultaneous removal, by vaporization, of the volatile solvent. Vaporization removal of the volatile liquid appears to be essential for formation of the agglomerate spheroidal globules.

Vaporization of the volatile liquid can be accomplished by frictional heat produced by the agitation of the mixture. Since this is rather slow, the vaporization rate is preferably increased by moderate heating and/or drawing a vacuum while agitation is proceeding. Either or both of these procedures can be carried out by employing a conventional mixer fitted with vacuum and/or heating means. Heating temperatures are determined by such factors as the vaporization temperature of the volatile liquid; the rate of cure of the particular prepolymer, which may be influenced by the kind and amount of associated curing agent; and the desired size of the beads. The degree of vacuum is dictated by similar considerations. In any case the rate of volatile liquid vaporization should not be so high that the liquid is substantially completely removed prior to coalescence of the solid particles coated with liquid prepolymer into globules of the desired size.

The organic liquid prepolymer can be any prepolymer which is curable into a solid by the action of a curing agent with or without the additional application of heat. Many such liquid organic prepolymers and related curing agents are well known in the art. Generally, the cure involves further polymerization of a partially polymerized liquid prepolymer into a solid, higher molecular weight polymer, with or without crosslinking.

Some examples of liquid prepolymers further polymerizable to solid polymers include polybutadiene, hydroxy- and carboxy-terminated polybutadiene, polybutadiene acrylic acid, polyurethane, organic polysulfides, ethyl acrylate-acrylic acid copolymer, epoxies, acrylates and methacrylates, polyesters, polyamides, and many others. The prepolymer can be selected for its compatibility with materials in which the spheroidal agglomerates may be embedded, as for example, the organic polymer binder of a propellant grain. Carboxy-terminated polybutadiene is a preferred polymer.

Appropriate curing agents for the prepolymers are also well known in the polymer art and include, for example, epoxides; inorganic and organic metal salts, e.g. $AlCl_3$, $SnCl_4$, chromium octoate, iron octoate, iron linoleate, dibutyl tin diacetate; organic peroxides and nitriles; secondary and tertiary amines and polyamines; imines; isocyanates; and the like.

The amount of prepolymer must be at least sufficient to coat the particulate solids to be dispersed therein and, thereby to coalesce into larger agglomerate globules. The amount obviously will vary with the desired concentration of particulate solids loading in the globules and their particle size. The ratio of prepolymer to particulate solids is also a factor in control of bead size. In general, the smaller the ratio, the smaller the resulting beads. The particulate solids are preferentially coated by the prepolymer rather than the volatile liquid because of the greater adhesive properties of the former.

The curing agents are employed in amounts known to the art to be effective to cure the particular liquid prepolymer component. Preferably they are used in excess of the minimum amount required for cure in order to increase the rate of cure as desired.

The substantially immiscible volatile liquid vehicle can be any readily volatilizable liquid which does not dissolve the prepolymer, the cured solid polymer, or the dispersed particulate solids to any substantial extent. Such volatile liquids are well known in the art and include, for example, such organic liquids as acetone, methyl ethyl ketone, methanol, methyl acetate, methylene chloride, ethylene dichloride, and chlorofluorocarbon compounds which are liquid at normal ambient pressures, such as trichlorotrifluoroethane. Water may be used if the particulate solids are substantially water-insoluble. In general, it is preferred to employ a volatile liquid having a maximum boiling point of about 100° C.

The amount of volatile immiscible liquid must be sufficient to provide a fluid slurry when admixed with the other components used in the process so that the prepolymer and particulate solids are in suspension during the agglomerating phase. Sufficient volatile liquid should also be available to provide for volatilization of at least a portion during the agglomeration period. The rate of volatilization and, therefore, the amount of volatile liquid vehicle required, are also factors influenced by such volatilization means as applied vacuum and/or external heating.

The volatile liquid can be volatilized by the frictional heat produced by the continuing agitation of the slurry mixture. The rate of volatilization induced in this manner may be adequate in some cases, particularly if the liquid volatilizes at a temperature which is only several degrees above normal ambient temperatures. Usually it is preferable to increase the rate of vaporization by applying a vacuum and/or heating the mixture while agitating. Such procedures reduce production time and can be used effectively to control the overall size of the spheroidal agglomerates. In general, the more rapid the rate of volatilization, the smaller is the size of the beads. The elevated temperatures applied are determined by the boiling point of the volatile liquid at the particular pressure and the rates of volatilization desired. The degree of vacuum drawn is dictated by similar considerations. The manipulation of these factors are within the routine skill of the art.

The process can be applied to any particulate solids for applications wherein agglomerates of finely divided particles are desirable. The spheroidal shape is particularly desirable where free-flowing pelleted materials are needed. It is particularly useful for the production of spheroidal aggregates of particulate high-energy fuel additives such as carbon and metallic fuels, particulate solid oxidizer, and mixtures thereof for use in propellants, explosives, igniters, and pyrotechnics. The polymer matrix of the beads disintegrates during combustion to release the solid high-energy fuel and/or oxidizer particles.

In the case of conventional propellants, addition of high-energy solid fuel, such as carbon or metallic fuel, of very small particle size in the form of agglomerate beads is particularly useful. For example, higher loadings of total solids can be obtained because of reduced propellant mix viscosity and, therefore, improved processability. Finely-divided solid oxidizer can be beaded separately or in admixture with the metallic fuel. Ballistic modifiers, such as burning rate catalysts, can, if desired, be incorporated with the beaded fuel and/or oxidizer. Highly reactive metallic fuels and oxidizers can be insulated from the other components in the propellant composition by the polymer bead matrix.

Metallic fuels include metals, for example, Na, Li, Al, Mg, B, Be, Zr; metal hydrides, such as $AlH_3$, $BeH_2$, $ZrH_4$, boranes; and mixtures thereof. Al, B, and Be are particularly preferred high-energy additives in propellants. The oxidizers can be solid organic oxidizers, such as cyclotrimethylene trinitramine, cyclotetramethylene tetranitramine, and pentaerythritol tetranitrate. More generally, they are solid inorganic oxidizer salts, such as the ammonium, alkaline earth metal, e.g. Ca, Sr, and alkali metal, e.g. K, Na, Li, nitrates and perchlorates. Ammonium perchlorate is a preferred oxidizer. Water should not be used as the volatile liquid for beading the water-soluble inorganic oxidizer salts.

It may be useful for certain applications to agglomerate carbon or metallic fuel and oxidizer within the same bead matrix so that they are very intimately admixed. Such agglomerates are particularly desirable for use in fuel-rich propellants employed in air-augmented rocket propulsion because of the improvement in certain combustion and ballistic properties essential to the system.

The processing of mixtures of different solid particle species is substantially the same as the processing of a single species. The different particulate solid species may be added separately to the process mixture or admixed prior to such addition. The latter is preferred since it reduces overall mixing time to achieve uniform dispersion of the different species.

It has been found that two or more different solid species, introduced into the beading mixture and processed in accordance with the present invention, are substantially uniformly dispersed in the spheroidal agglomerates in substantially the same ratio of concentration. This is important for end-product reproducibility.

Particle size of the particulate solids is not a critical consideration in the processing of the beads and is largely determined by the end use of the spheroidal agglomerates. For example, in propellant use, small particle size high-energy fuels are generally desired, as for example, from sub-micron size, e.g. 0.001 micron, to about 50 microns, preferably up to about 10 microns. Oxidizer size range can be from sub-micron size, e.g. 0.001, up to $600\mu$, preferably up to about $400\mu$.

Similarly, the spheroidal agglomerates can be made over a wide range of sizes, with minimum sizes largely determined by the particle size of the solid particles being agglomerated, and specific bead sizes being controllably produced within desired ranges for the particular end use application.

The following examples are illustrative of the invention but are in no way limiting:

Example 1

200 g. boron powder (particle size $2-3\mu$), 9.64 g. liquid carboxy-terminated polybutadiene prepolymer (CTPB), 2.26 g. epoxide curing agent, 0.10 g. chromium octoate curing catalyst and 250 ml. trichlorotrifluoroethane (Freon 113) were thoroughly mixed for several minutes in a mixer equipped with vacuum means and a heating jacket. The mixture was then continuously stirred at a temperature of 120° F. under partial vacuum for about ten minutes. The vacuum was then further reduced to about 2–3 mm. and the mixture continuously stirred at a temperature of about 120° F. for 15 minutes. Agitation was then discontinued. The spheroidal agglomerates or beads were well formed and solidified, and substantially all of the Freon 113 had vaporized.

The resulting beads, which comprised the boron dispersed within a solidified CTPB matrix, were then placed in a curing oven at 160° F. for about 18 hours.

95% of the boron powder had been consolidated into the bead agglomerates, which ranged in size from −16 to +48 mesh Tyler standard screen scale (0.99–0.295 mm.).

Example 2

190 g. boron ($2-3\mu$ size), 10 g. ammonium perchlorate (AP) ($10\mu$ size), 9.6 g. liquid CTPB prepolymer, 2.26 g. epoxide curing agent, 0.10 g. chromium octoate, and 250 ml. of Freon 113 were processed and the resulting beads post cured as described in Example 1.

Analysis of the beads indicated a substantially uniform 95:5 ratio of B:AP.

Example 3

86.0 g. boron ($2*3\mu$ size), 82 g. AP ($10\mu$ size), 32 g. Al ($8\mu$ size), 9.64 g. liquid CTPB prepolymer, 2.26 g. epoxide curing agent, 0.10 g. chromium octoate, and 300 ml. Freon 113 were processed and the resulting beads post cured as described in Example 1.

Analysis of the beads indicated substantially the same ratio of B/AP and Al as that added to the mixture.

Example 4

66.66 g. Al ($8\mu$ size, spheroidal), 133.34 g. AP ($10\mu$ size), 9.64 g. liquid CTPB prepolymer, 2.26 g. epoxide curing agent, 0.10 g. chromium octoate, and 200 ml. Freon 113 were processed and the resulting beads post cured as described in Example 1.

Analysis of the beads indicated substantially uniform ratio of Al to AP as that added to the mixture.

Example 5

150 g. carbon black, 50 g. AP ($10\mu$ size), 9.67 g. liquid CTPB prepolymer, 2.23 g. epoxide curing agent, 0.1 g. chromium octoate, and 25 ml. Freon 113 were processed and the resulting beads post cured as described in Example 1.

Analysis of the beads indicated substantially uniform ratio of C to AP as that added to the mixture.

I claim:

1. A process for bonding finely-divided solid particles by means of a solid organic polymer matrix into spheroidal agglomerates, which comprises:
   (a) admixing said solid particles with an organic liquid prepolymer curable to a solid, and a volatile liquid substantially immiscible with said prepolymer;
   (b) agitating the resulting mixture and simultaneously removing the volatile liquid by vaporization, to form spheroidal globules of said liquid prepolymer containing said particles dispersed therein; and
   (c) continuing the agitation and removal of said volatile liquid until the prepolymer cures into a solid polymer to form spheroidal agglomerates of said solid particles in a solid organic polymer matrix.

2. The process of claim 1 wherein a curing agent effective to cure said liquid prepolymer to a solid is admixed with said solid particles, said liquid prepolymer, and said volatile liquid.

3. The process of claim 2 wherein said removal of the volatile liquid by vaporization is promoted by subjecting said mixture to a vacuum, or by heating said mixture, or by both subjecting said mixture to a vacuum and heating said mixture.

4. The process of claim 3 wherein said solid particles are selected from the group consisting of high-energy fuel, oxidizer, and mixtures thereof.

5. The process of claim 4 wheerin said high-energy fuel is a carbon or metallic fuel selected from the group consisting of metals, metal hydrides and mixtures thereof.

6. The process of claim 4 wherein the metallic fuel is selected from the group consisting of Na, Li, Al, Mg, B, Be, Zr, aluminum hydride, beryllium hydride, zirconium hydride, boranes, and mixtures thereof.

7. The process of claim 6 wherein the metallic fuel is boron.

8. The process of claim 6 wherein the metallic fuel is aluminum.

9. The process of claim 5 wherein solid particles of inorganic oxidizer salt are admixed with said carbon or metallic fuel.

10. The process of claim 6 wherein solid particles of inorganic oxidizer salt are mixed with said solid fuel.

11. The process of claim 9 wherein the inorganic oxidizer salt is ammonium perchlorate.

12. The process of claim 11 wherein the inorganic oxidizer salt is ammonium perchlorate.

13. The process of claim 12 wherein the metallic fuel is boron.

14. The process of claim 12 wherein the metallic fuel is aluminum.

References Cited

UNITED STATES PATENTS

| 3,348,986 | 10/1967 | Sauer | 264—3 X |
| 3,480,488 | 11/1969 | Rudy et al. | 149—7 |
| 3,522,334 | 7/1970 | Hunter et al. | 264—3 |

CARL D. QUARFORTH, Primary Examiner

S. J. LECHERT, JR., Assistant Examiner

U.S. Cl. X.R.

149—22, 44, 76, 87